US009963018B2

(12) United States Patent
Williams et al.

(10) Patent No.: US 9,963,018 B2
(45) Date of Patent: May 8, 2018

(54) VEHICLES AND VEHICLE ROOF STRUCTURES FOR CONCEALING ONE OR MORE SENSORS

(71) Applicant: Toyota Motor Engineering & Manufacturing North America, Inc., Erlanger, KY (US)

(72) Inventors: Paxton S. Williams, Milan, MI (US); Jaime N. Moore, Ann Arbor, MI (US); Crystal J. Mink, South Lyon, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 19 days.

(21) Appl. No.: 15/193,768

(22) Filed: Jun. 27, 2016

(65) Prior Publication Data
US 2017/0369003 A1    Dec. 28, 2017

(51) Int. Cl.
*B60J 1/02* (2006.01)
*B60R 13/02* (2006.01)
*B62D 25/06* (2006.01)
*B60J 3/00* (2006.01)
*B60J 1/18* (2006.01)
*B60R 11/00* (2006.01)

(52) U.S. Cl.
CPC . *B60J 1/02* (2013.01); *B60J 1/18* (2013.01); *B60J 3/007* (2013.01); *B60R 11/00* (2013.01); *B60R 13/0212* (2013.01); *B62D 25/06* (2013.01); *B60R 2011/0026* (2013.01)

(58) Field of Classification Search
CPC ...... B60J 1/02; B60J 1/18; B60J 3/007; B60R 11/00; B60R 2011/0026; B60R 2011/0028; B60R 13/02; B60R 13/0212; B62D 25/06
USPC .............................. 296/84.1, 190.1, 210, 214
See application file for complete search history.

(56) References Cited

U.S. PATENT DOCUMENTS

| 6,307,198 | B1 | 10/2001 | Asakura et al. |
| 7,236,249 | B1 | 6/2007 | Michenfelder et al. |
| 7,258,454 | B2 | 8/2007 | Noguchi et al. |
| 8,687,196 | B2 | 4/2014 | Demma |
| 9,126,469 | B2 * | 9/2015 | Weicker ..................... B60J 1/02 |
| 9,244,165 | B1 | 1/2016 | Lynam |
| 2007/0216768 | A1 * | 9/2007 | Smith ........................ B60J 1/02 348/118 |

(Continued)

FOREIGN PATENT DOCUMENTS

EP             1462244 A1     9/2004

*Primary Examiner* — Jason S Daniels
(74) *Attorney, Agent, or Firm* — Dinsmore & Shohl LLP

(57) ABSTRACT

Embodiments of the present disclosure are directed to vehicles and vehicle roof structures for concealing one or more sensors. Vehicle roof structures according to the present disclosure include a roof panel and a window extending at least up to the roof panel. A headliner extends along an interior portion of the roof panel to the window and is at least partially spaced from the roof panel in a direction of an interior of the vehicle to provide a sensor mounting volume therebetween, wherein the window extends along at least a portion of the sensor mounting volume. One or more sensors are positioned behind the window within the sensor mounting volume to provide a signal indicative of a characteristic of an environment of the vehicle detected by the one or more sensors through the window.

20 Claims, 5 Drawing Sheets

(56) References Cited

U.S. PATENT DOCUMENTS

2008/0265629 A1\* 10/2008 Fry .................. B60R 11/02
                                                                                                                 296/214
2010/0098917 A1    4/2010  Lyon
2017/0182952 A1\* 6/2017  Carlson ............. B60R 11/04

\* cited by examiner

VEHICLES AND VEHICLE ROOF STRUCTURES FOR CONCEALING ONE OR MORE SENSORS

TECHNICAL FIELD

The present specification generally relates to vehicles and vehicle roof structures and, more specifically, to vehicles and vehicle roof structures for concealing one or more vehicle sensors.

BACKGROUND

Vehicles on the road today use a variety of sensors to detect different aspects of an environment. These sensors may then communicate this detected information about the environment to the driver or cause the vehicle to react in some way (e.g. a rain sensor that causes the windshield wipers to swipe across the windshield.) Such sensors may need to be placed in a variety of locations on the vehicle. In many instances, it may be desirable to place certain sensors near the roof of the vehicle. However, because of the size or awkwardness of some sensors, placing a sensor on the roof of the vehicle may be less visually appealing to consumers. For instance, large sensors, such as autonomous vehicle sensors, are not easily concealable and are often found to be visually unattractive to many consumers.

Accordingly, a need exists for alternative roof structures to conceal vehicle sensors to preserve the visual appeal of the vehicle while not unduly affecting the performance of the sensors.

SUMMARY

In one embodiment, a vehicle roof structure for concealing one or more sensors includes a roof panel and a window extending at least up to the roof panel. A headliner extends along an interior portion of the roof panel to the window and is at least partially spaced from the roof panel in a direction of an interior of the vehicle to provide a sensor mounting volume there between, wherein the window extends over at least a portion of the sensor mounting volume. One or more sensors are positioned behind the window within the sensor mounting volume to provide a signal indicative of a characteristic of an environment of the vehicle detected by the one or more sensors through the window.

In another embodiment, a vehicle roof structure for concealing one or more sensors includes a roof panel comprising one or more sensor cavities. A window extends by the one or more sensor cavities. One or more sensors are positioned within the one or more sensor cavities of the roof panel to provide a signal indicative of a characteristic of an environment of the vehicle detected by the one or more sensors through the window.

In yet another embodiment, a vehicle for concealing one or more sensors includes a roof structure. The roof structure includes a roof panel. A window extends at least up to the roof panel. A headliner extends along an interior portion of the roof panel to the window and is at least partially spaced from the roof panel in a direction of an interior of the vehicle to provide a sensor mounting volume therebetween, wherein the window extends along at least a portion of the sensor mounting volume. One or more sensors are positioned behind the window and within the sensor mounting volume to provide a signal indicative of a characteristic of an environment of the vehicle detected by the one or more sensors through the window. One or more processors are communicatively coupled to the one or more sensors to receive from the one or more sensors the signal indicative of the characteristic of the environment and execute logic to cause the vehicle to respond to the signal indicative of the characteristic of the environment received from the one or more sensors.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include vehicles and vehicle roof structures for concealing one or more sensors therein. Generally, vehicles according to the present disclosure include a roof panel and a window extending at least up to the roof panel. In some embodiments, a headliner extends along an interior portion of the roof panel to the window and is at least partially spaced from the roof panel in a direction of an interior of the vehicle to provide a sensor mounting volume. One or more sensors are positioned within the sensor mounting volume behind the window to provide a signal indicative of a characteristic of an environment of the vehicle detected by the one or more sensors through the window. One or more processors may be communicatively coupled to the one or more sensors to cause the vehicle to respond to the signal indicative of the characteristic received from the one or more sensors. The various vehicle roof structures for concealing one or more vehicle sensors therein will be described in more detail herein with specific reference to the corresponding figures.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted).

Figure 1:
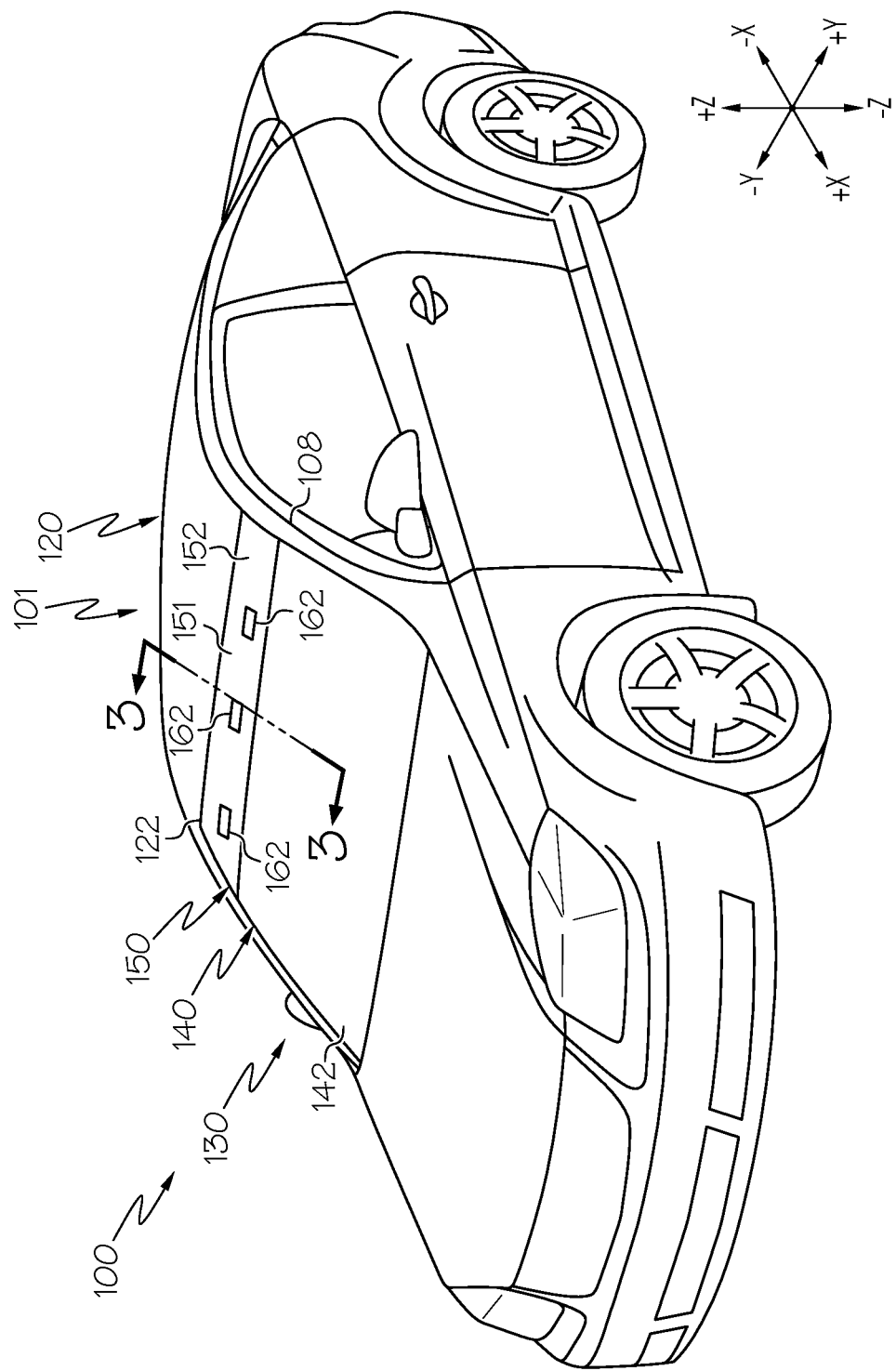
FIG. 1 depicts a perspective view of a vehicle for concealing one or more sensors according to one or more embodiments shown and described herein.

Referring now to the drawings, FIG. 1 depicts an embodiment of a vehicle 100 that includes a roof structure 101 for concealing one or more sensors therein. The roof structure 101 may include a window 130, front pillars 108, and a roof panel 120. A roofline 122 extends in the vehicle lateral direction and defines a transition point wherein the window 130 ends and the roof panel 120 begins in the vehicle vertical direction. In some embodiments however, the window 130 may actually extend beyond the roof line 122 in the vehicle vertical direction. It is noted that while the vehicle 100 is depicted as an automobile, the vehicle 100 may be any passenger vehicle such as, for example, a terrestrial, aquatic, and/or airborne vehicle. In some embodiments, the vehicle 100 may be an autonomous vehicle.

Figure 2:
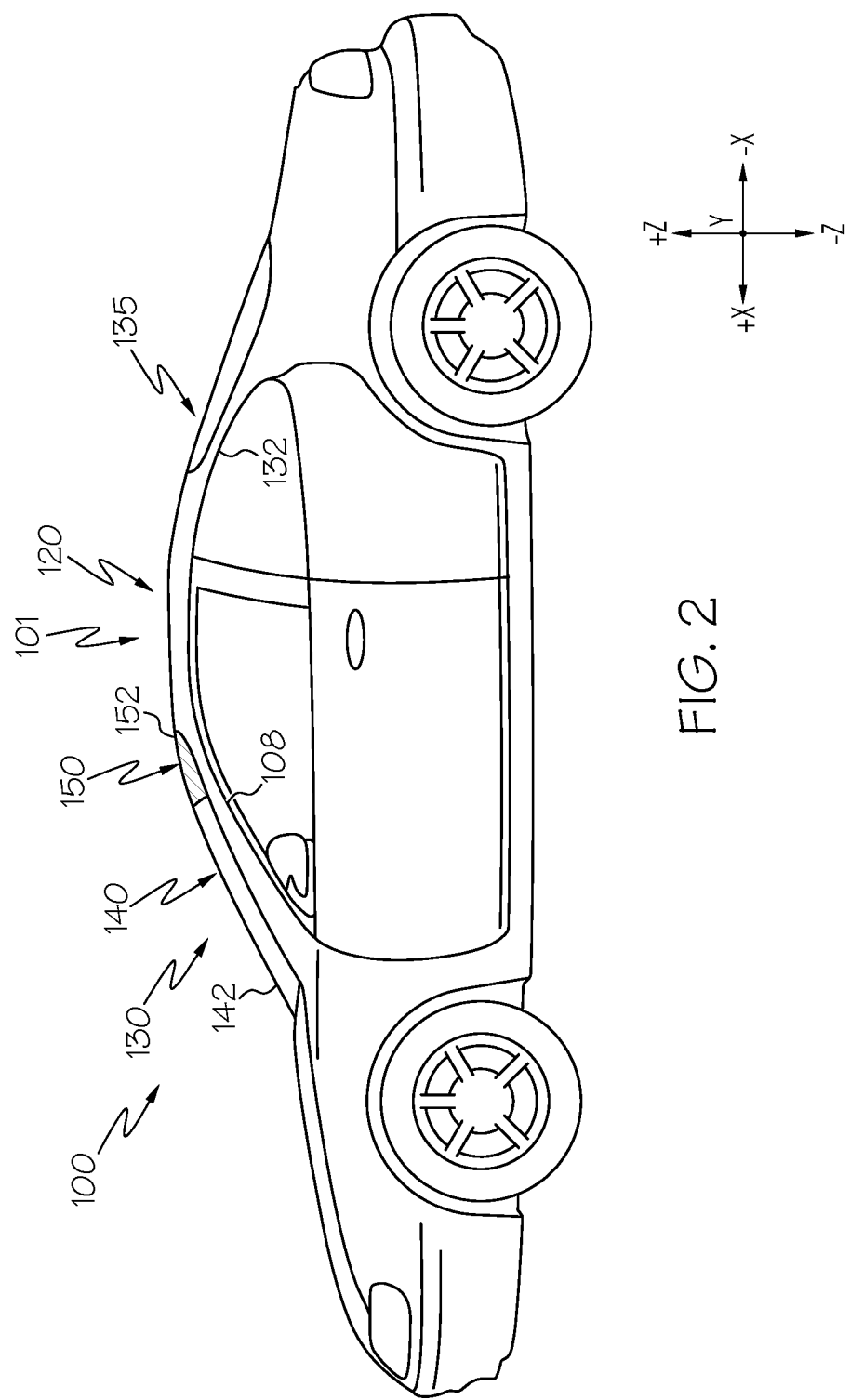
FIG. 2 depicts a side view of the vehicle of FIG. 1 according to one or more embodiments shown and described herein.

Referring briefly to FIG. 2, in some embodiments, the window 130 may be at least one of a windshield 140 and a rear window 135 of the vehicle 100. It is noted that the remainder of the detailed description will refer to an embodiment wherein the window 130 is a windshield 140. However, it is noted that similar structural descriptions will apply equally to embodiments wherein the window 130 is a rear window 135 of the vehicle 100.

Referring again to FIG. 1, the windshield 140 extends between the front pillars 108 of the vehicle 100 in the vehicle lateral direction and up to the roofline 122 in the vehicle vertical direction. Referring also to FIG. 2, the windshield 140 may be generally angled, along with the front pillars 108, from the vehicle vertical direction toward the rear of the vehicle 100 in the vehicle longitudinal direction. Together the windshield 140 and front pillars 108 may gently curve from their generally angled orientation to blend with the roof panel 120. In some embodiments, the transition portion 150 may include a tint or other coating.

Still referring to FIG. 1, the windshield 140 generally includes a lower portion 142 and a transition portion 150. Generally, the lower portion 142 of the windshield 140 is the portion of the windshield 140 a driver of the vehicle 100 would see through while driving. The transition portion 150 spans the distance between the lower portion 142 of the windshield 140 and the roofline 122. The transition portion 150 of the windshield 140 may generally be the portion of the windshield 140 used to conceal the contents of the roof structure 101 as will be described in more detail herein. In some embodiments, the lower portion 142 and the transition portion 150 are a single panel such that the windshield 140 is a continuous substrate. In other embodiments, the lower portion 142 and the transition portion 150 are separate panels that are positioned adjacent to one another to form the windshield 140. In embodiments wherein the windshield 140 comprises separate substrates, the lower portion 142 of the windshield 140 may be supported by a flange extending from the roof panel 120, or some other structural member 123 (illustrated in FIGS. 3A and 3B) extending in the vehicle lateral direction to support the lower portion 142 of the windshield 140 where the windshield 140 transitions from the lower portion 142 to the transition portion 150.

As described above, the lower portion 142 of the windshield 140 is generally the portion of the windshield 140 that a driver of the vehicle 100 would look through while driving. The lower portion 142 of the windshield 140 may therefore be made of traditional windshield 140 materials and have traditional windshield 140 structures. In some embodiments, the lower portion 142 and the transition portion 150 are made from the same materials. In other embodiments, the transition portion 150 is made from different materials than that of the lower portion 142. For example, and not as a limitation, the lower portion 142 may be made of glass and the transition portion 150 may be made of a plastic (e.g., polycarbonate plastic) or a different type of glass.

Figure 3A:
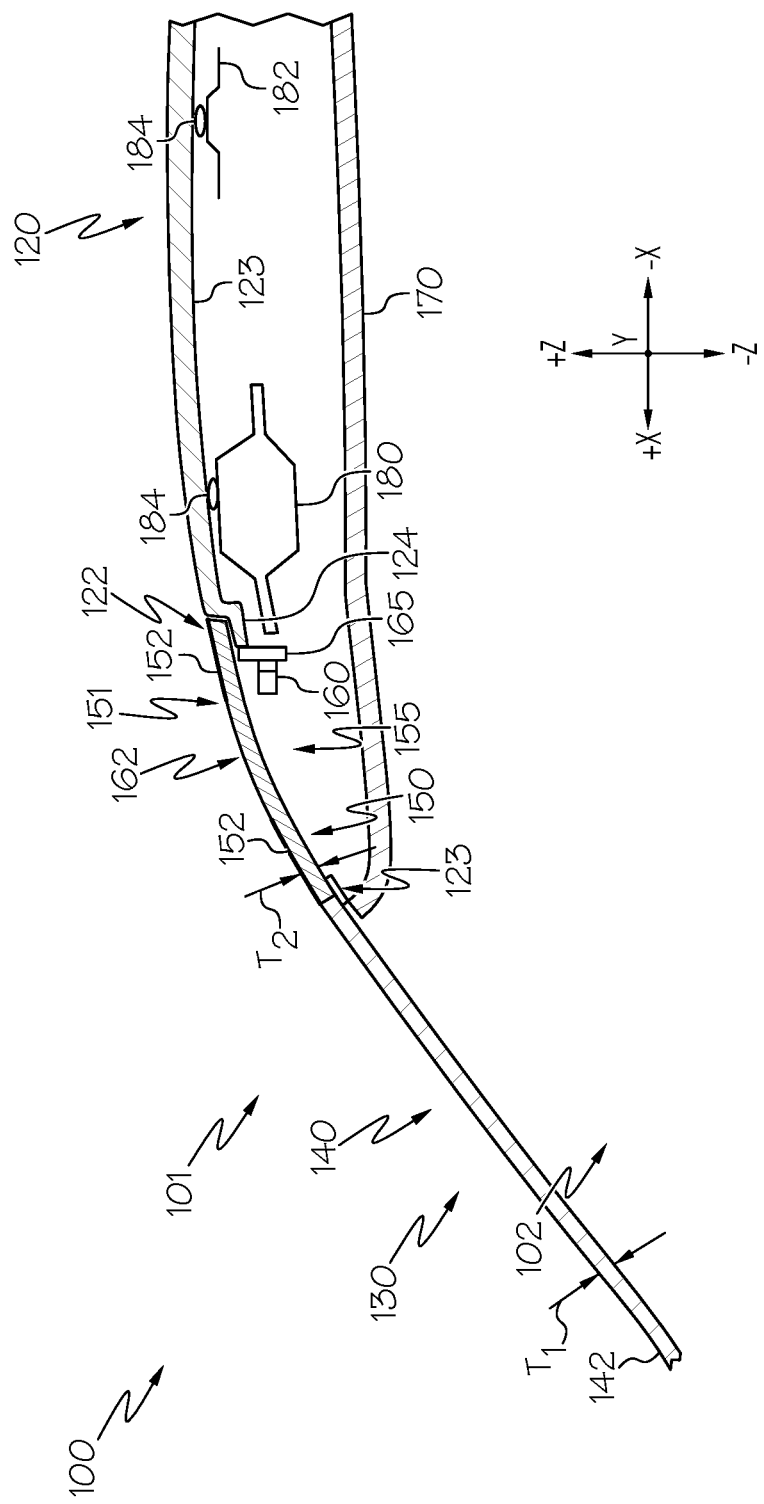
FIG. 3A schematically depicts a cross-sectional view of a roof structure of the vehicle of FIG. 1 indicated by 3-3 according to one or more embodiments shown and described herein.
Figure 3B:
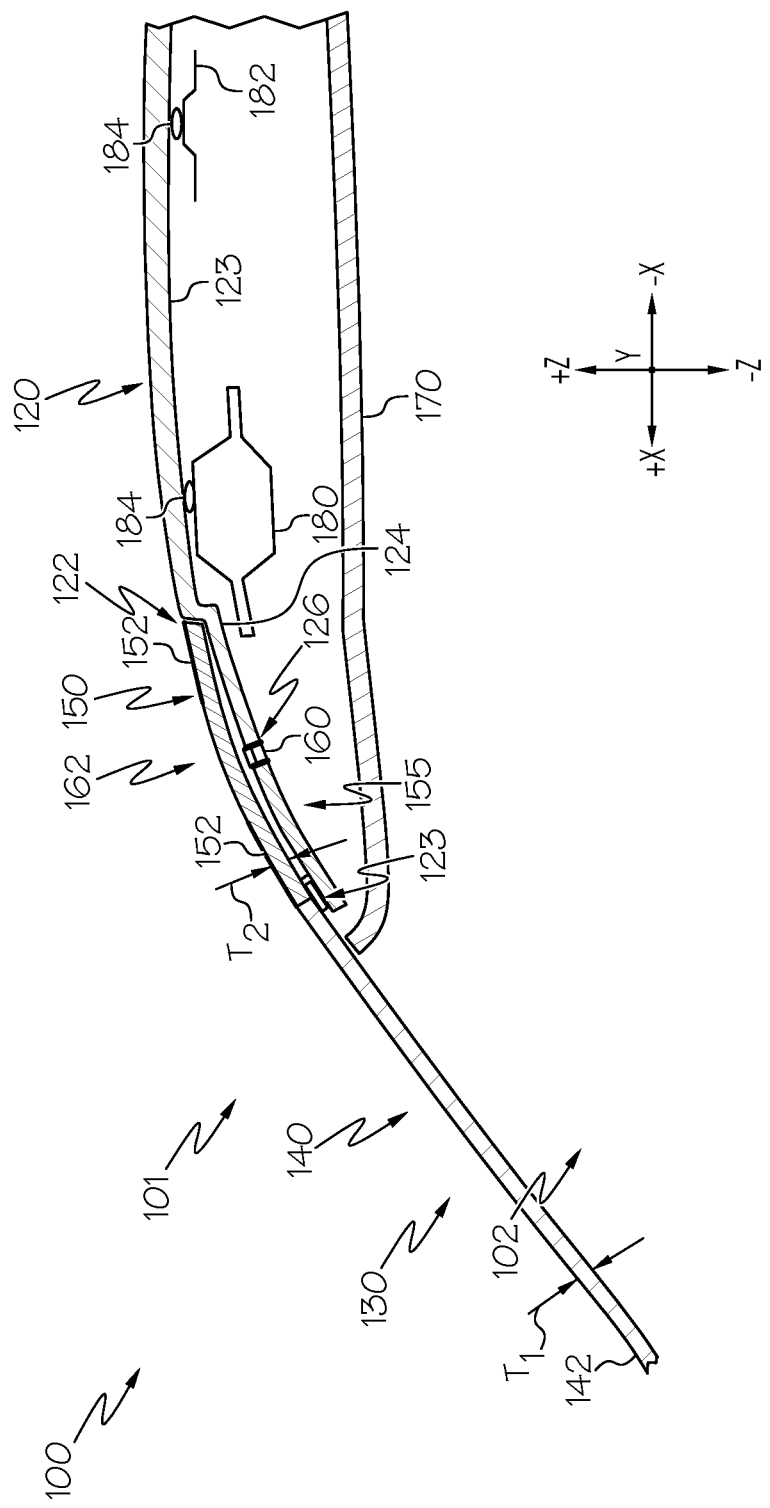
FIG. 3B schematically depicts another cross-sectional view of a roof structure of the vehicle of FIG. 1 indicated by 3-3 according to one or more embodiments shown and described herein.

FIGS. 3A and 3B schematically illustrate two non-limiting cross-sectional views of the roof structure 101 according to one or more embodiments disclosed herein. As described above, the roof structure 101 generally includes the roof panel 120 and the windshield 140. The roof structure 101 may further include a headliner 170, a front header 180, one or more cross bows 182, and one or more sensors 160.

The roof panel 120 is supported within the roof structure 101 by the front header 180. The roof panel 120 may further be supported by the one or more roof bows 182. Though not shown, the front header 180 and the one or more roof bows 182 extend in the vehicle lateral direction to connect to a portion of a frame of the vehicle 100 (e.g., side rails) to support the roof panel 120. The roof panel 120 may be adhered to the front header 180 and one or more roof bows 182 by mastic 184 or other adhesives. The roof panel 120 may also be welded to the front header 180 in a discrete location. The roof panel 120 may be made of a variety of materials including but not limited to sheet metal, fiberglass, and polycarbonate plastic.

Referring now to the windshield 140, the lower portion 142 of the windshield 140 is generally depicted as having a substantially linear cross-section. However, it is contemplated that in some embodiments, the lower portion 142 of the windshield 140 may have a curvilinear cross-section. Therefore, in some embodiments, the transition portion 150 of the windshield 140 curves away from cross-sectional orientation of the lower portion 142 to blend with the roof panel 120 of the vehicle 100. In other embodiments, the transition portion 150 of the windshield 140 continues to follow the cross-sectional orientation of the lower portion 142 to substantially blend with the roof panel 120 of the vehicle 100. The amount of curvature experienced by the transition portion 150 of the windshield 140 may be dependent on the curvature of the roof panel 120 as compared with the orientation of the lower portion 142 of the windshield 140. As such the curvature of the transition portion 150 of the windshield 140 may be slight or may be more pronounced. In any case, the windshield 140 of the vehicle 100 may appear to extend beyond traditional vehicle rooflines. This concept will become more apparent in the following discussion.

The lower portion 142 and the transition portion 150 have thicknesses $T_1$, $T_2$ respectively. Though $T_1$, $T_2$ may be substantially equal, it is contemplated that the transition portion 150 may have a smaller thickness than that of the lower portion 142. It is further contemplated that the smaller thickness of the transition portion 150 may allow the material of the transition portion 150 to be more easily formed with a curvature to blend toward the roof panel 120 of the vehicle 100.

A shade band 151 may be incorporated in or applied to at least a portion of the transition portion 150 of the windshield 140. The shade band 151 provides the transition portion 150 with reduced visible light transmission (e.g., 80 percent or less, such as 50 percent or less) as compared to the lower portion 142 of the windshield 140. In some embodiments, the shade band 151 may reduce wavelengths other than visible light in the electromagnetic spectrum. The shade band 151 may be provided in a variety of ways. For example, and without limitation, the shade band 151 may be provided by at least one of window tinting, black ceramic paint, or a combination thereof. In embodiments, wherein black ceramic paint is used to provide the shade band 151, the black ceramic paint may be provided as patterned dots that increase in density toward the roofline 122 of the vehicle 100. In some embodiments, the shade band 151 may not be completely isolated to the transition portion 150 of the windshield 140 but may also extend into the lower portion 142 of the windshield 140.

In some embodiments, the transition portion 150 includes a concealing region 152 and one or more sensor regions 162. The concealing regions 152 may have reduced visible light transmission as compared to the one or more sensor regions 162. In such embodiments, the shade band 151 may only cover the concealing region 152 of the transition portion 150. The one or more sensor regions 162 may provide a window through which the one or more sensors 160 may detect a characteristic of the environment of the vehicle 100 through the transition portion 150 of the windshield 140. As described above, the reduced visible light transmission of the transition portion 150 of the windshield 140, and/or the concealing region 152, may be provided by at least one of window tinting and black ceramic paint applied to or within the transition portion 150 or the windshield 140. It is also contemplated that the material used for the transition portion 150 of the windshield 140 itself may have less visible light transmission as compared to standard windshield glass. The reduced visible light transmission of the transition region of the windshield 140 may reduce visibility from the outside of the vehicle 100 into the roof structure 101 to conceal the internal components of the roof structure 101 from outside viewers, as will be described in more detail below.

Still referring to FIGS. 3A and 3B, the roof structure 101 further includes a headliner 170 extending along an interior portion 123 of the roof panel 120 to the windshield 140. The headliner 170 may be at least partially spaced from the roof panel 120 in the vehicle vertical direction toward an interior 102 of the vehicle 100 to provide a sensor mounting volume 155 therebetween, wherein the windshield 140 extends along or over at least a portion of the sensor mounting volume 155. In some embodiments, the headliner 170 may contact the windshield 140 of the vehicle 100 at or below the position wherein the lower portion 142 of the windshield 140 meets the transition portion 150 of the windshield 140. While, placing the headliner 170 at or below the point of transition between the lower portion 142 and the transition portion 150 may substantially aid in concealing the interior of the roof structure 101 from outside eyes. Furthermore, in embodiments wherein the transition portion 150 and the lower portion 142 are separate panels, contacting the headliner 170 with the windshield 140 at or below the point of transition can substantially conceal any line created between the lower portion 142 and the transition portion 150 from the interior 102 of the vehicle 100.

The sensor mounting volume 155 may generally be defined as the space formed between the headliner 170, the windshield 140, and the roof panel 120. The sensor mounting volume 155 may provide a space having a height of between about 25 mm to about 100 mm, such as about 50 mm in some embodiments. Therefore, it should be apparent that the windshield 140 extends past the headliner 170 to meet the roof panel 120, such that the sensor mounting volume 155 is formed between the headliner 170, the windshield 140, and the roof panel 120. In traditional vehicles, the headliner 170 may instead be positioned at the interface between the windshield 140 and the roof panel 120 to cover the transition from the windshield 140 to the roof panel 120 from the interior of the vehicle 100.

Because of the added space provided by the sensor mounting volume 155, one or more sensors 160 may be mounted within the sensor mounting volume 155 and directed toward the transition portion 150 of the windshield 140, for example, to detect a characteristic of the environment of the vehicle 100 through the transition portion 150 of the windshield 140. In embodiments, where the transition portion 150 has one or more sensor regions 162 and a concealing region 152, the one or more sensors 160 may be located behind the one or more sensor regions 162 of the transition portion 150. Referring again to FIG. 1, three sensor regions 162 are depicted extending transversely across the width of the windshield 140. However, it is contemplated that roof structures according to the present disclosure may have a fewer or greater number of sensor regions 162. Furthermore, it is contemplated that there may be no need for discrete sensor regions wherein the transition portion 150 is made of a material invisible to the one or more sensors 160 such that the sensors 160 may detect a characteristic of the environment through the transition portion 150. As an example, a widthwise continuous transition portion 150 may be provided for use by multiple sensors 160.

Referring again to FIG. 2, it is also noted, that, the sensor mounting volume 155 may, instead or in addition to being located at a forward end of the roof structure 101 in the vehicle longitudinal direction, be located at a rearward location of the roof structure 101 in the vehicle longitudinal direction. In that case, the window 130 may be a rear window 135 of the vehicle 100. The rear window 135 may, similar to the windshield 140, extend between rear pillars 132 of the vehicle 100 in the vehicle lateral direction and up to the roof panel 120 in the vehicle vertical direction. The rear window 135 may be generally angled, along with the rear pillars 132, from the vehicle vertical direction toward a forward direction of the vehicle 100 in the vehicle longitudinal direction. Together the rear window 135 and rear pillars 132 may gently curve from their generally angled orientation to blend with the roof panel 120. As such, a rear sensor mounting volume may be formed between the headliner 170, the rear window 135 of the vehicle 100, and the roof panel 120. In such embodiments, the rear window 135 of the vehicle 100 may include a transition portion behind which the sensor mounting volume 155 may be formed.

Referring again to FIGS. 3A and 3B, the one or more sensors 160 may include a variety of sensors 160, and in some embodiments, the one or more sensors 160 are a plurality of sensors. For instance, the one or more sensors 160 may be at least one of LiDAR, vehicle-to-vehicle communication, camera, radar, and laser. The one or more sensors 160 may provide a variety of environmental information to the vehicle 100 to allow the vehicle 100 to react in response to the signal provided by the one or more sensors 160. Examples are described in more detail below.

Referring specifically to FIG. 3A, the one or more sensors 160 may be mounted within the sensor mounting volume 155 by one or more sensor brackets 165. The one or more sensor brackets 165 may be any article capable of restricting the movement of the one or more sensors 160 within the sensor mounting volume 155. The one or more sensor brackets 165 may couple the one or more sensors 160 to the roof panel 120 of the vehicle 100 or other components typically found within the roof structure 101 of a vehicle 100. For example, and without limitation, the one or more sensor brackets 165 may couple the one or more sensors 160 to the front header 180 of the vehicle 100. The front header 180 generally provides support and strength to the roof panel 120 and may provide a suitably sturdy article upon which to mount the one or more sensors 160. In either case, the sensor brackets 165 may be configured to direct the one or more sensors 160 toward the transition portion 150 of the windshield 140 such that the one or more sensors 160 may sense a characteristic of the environment of the vehicle 100 through the transition portion 150 of the windshield 140.

Referring now to both FIGS. 3A and 3B the roof panel 120 may include a windshield receiving portion 124. The windshield receiving portion 124 may be a flange that extends from the roof panel 120 in the vehicle vertical direction and in the vehicle longitudinal direction to allow the windshield 140 to rest thereon. The windshield receiving portion 124 may be integrally formed with the roof panel 120 or the windshield receiving portion 124 may be a separate part coupled to the roof panel 120. The windshield receiving portion 124 of the roof panel 120 may extend continuously along the length of the roofline 122 in the vehicle lateral direction to support the windshield 140. In other embodiments, there may be one or more windshield receiving portions 124 of the roof panel 120, which may be spaced along the length of the roofline 122 in the vehicle lateral direction to support the windshield 140. In some embodiments, the one or more sensor brackets 165 are coupled to the windshield receiving portion 124 of the roof panel 120.

Referring now to just FIG. 3B, in some embodiments, the windshield receiving portion 124 of the roof panel 120 may extend between the windshield 140 and the sensor mounting volume 155. In such embodiments, the windshield receiving portion 124 of the roof panel 120 may include one or more sensor cavities 126 formed therein. The one or more sensor cavities 126 may be formed within the windshield receiving portion 124 of the roof panel 120 at a position forward, in the vehicle longitudinal direction, of the roofline 122. In this embodiment, a separate sensor bracket may not be required to mount the one or more sensors 160 to the roof panel 120 of the vehicle 100. The one or more sensor cavities 126 may receive the one or more sensors 160 and may direct the one or more sensors 160 toward the transition portion 150 of the windshield 140 such that the one or more sensors 160 may sense a characteristic of the environment of the vehicle 100 through the transition portion 150 of the windshield 140. In yet further embodiments, the windshield receiving portion 124 of the roof panel 120 may extend to and support the lower portion 142 of the windshield 140.

As discussed above, the one or more sensors 160 are configured to produce a signal indicative of a characteristic of an environment of the vehicle 100 detected by the one or more sensors 160 through the windshield 140. The signal produced by the one or more sensors 160 may be communicatively coupled to different vehicle components to cause the vehicle 100 to respond to the signal. For example, referring now to FIG. 4, the vehicle 100 may include one or more processors 106 communicatively coupled to the one or more sensors 160. The one or more processors 106 may include any device capable of executing machine-readable instructions stored on a non-transitory computer-readable medium. Accordingly, the one or more processors 106 may include a controller, an integrated circuit, a microchip, a computer, an antenna, and/or any other computing device. The one or more processors 106 are coupled to a communication path 107 that provides signal interconnectivity between various components of the vehicle 100. Specifically, the communication path 107 provides signal interconnectivity between the one or more processors 106, the one or more sensors 160, and various modules of the vehicle 100. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 107 may be formed from any medium that is capable of transmitting a signal such as, for example, conductive wires, conductive traces, optical waveguides, or the like. In some embodiments, the communication path 107 may facilitate the transmission of wireless signals, such as WiFi, Bluetooth, and the like. Moreover, the communication path 107 may be formed from a combination of mediums capable of transmitting signals. In one embodiment, the communication path 107 comprises a combination of conductive traces, conductive wires, connectors, and buses that cooperate to permit the transmission of electrical data signals to components such as processors, memories, sensors, input devices, output devices, and communication devices. Accordingly, the communication path 107 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Embodiments of the present disclosure include logic that includes machine-readable instructions and/or an algorithm written in any programming language of any generation (e.g., 1GL, 2GL, 3GL, 4GL, and/or 5GL) such as, e.g., machine language that may be directly executed by the one or more processors 106, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As described above, the one or more sensors 160 are communicatively coupled to the one or more processors 106 over the communication path 107. As described above, the one or more sensors 160 are operable to sense one or more characteristics of an environment of the vehicle 100. In general, the one or more sensors 160 may sense characteristics of the environment including, but not limited to, rain, navigational information, oncoming obstacles, potentially hazardous obstacles, and other vehicles. Based on information detected by the one or more sensors 160, the one or more processors 106 may execute machine readable instructions to cause the vehicle 100 to respond to the characteristic detected by the one or more sensors 160.

Figure 4:
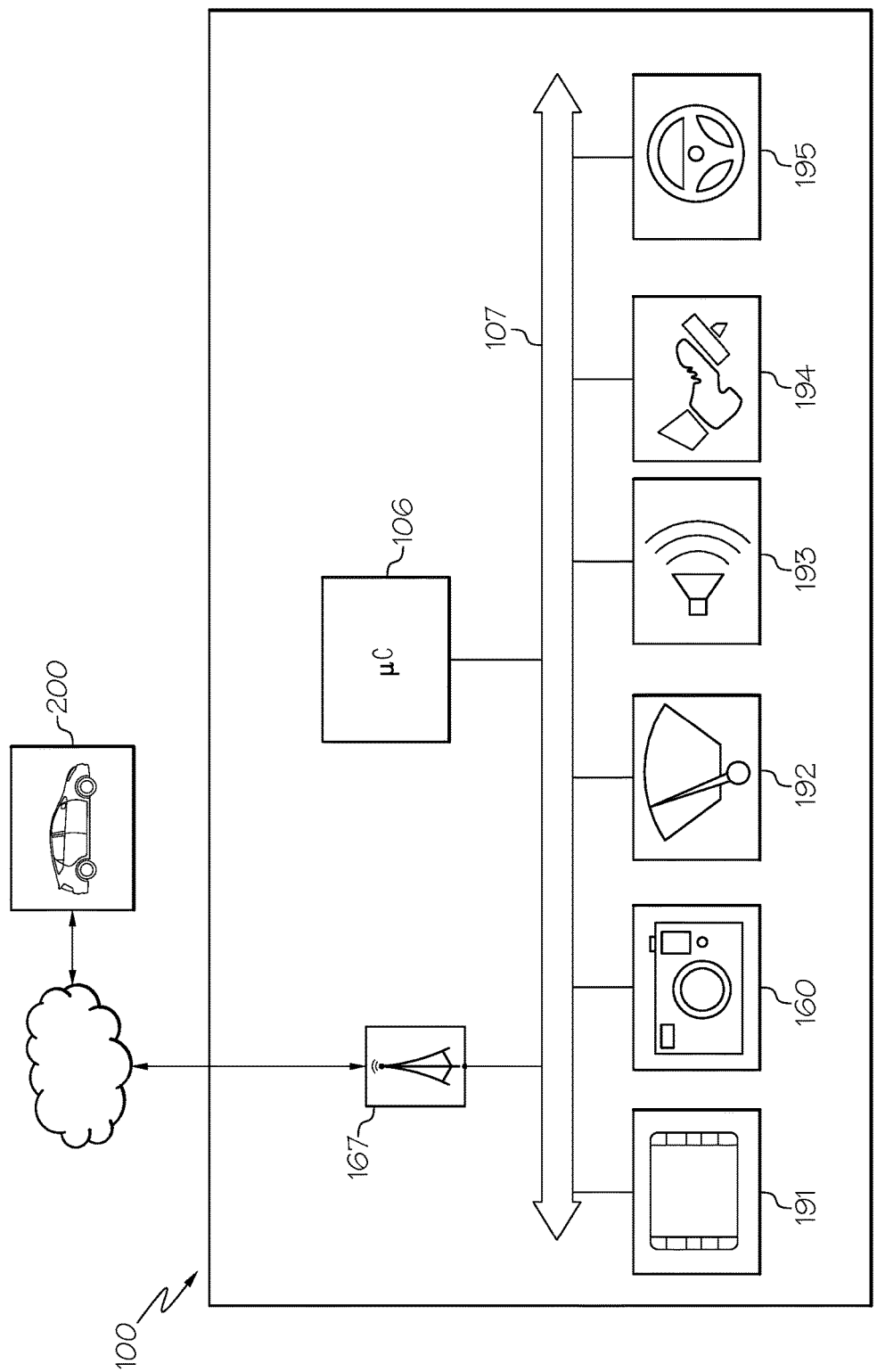
FIG. 4 schematically depicts one or more processors of the vehicle of FIG. 1 communicatively coupled to one or more sensors and vehicle systems according to one or more embodiments shown and described herein.

FIG. 4 illustrates a variety of non-limiting examples in which the one or more processors 106 may use the information from the one or more sensors 160. For instance, if the one or more sensors 160 detect rain, the one or more processors 106 may execute logic to cause windshield wipers 192 to turn on to wipe rain droplets from the windshield 140. In another example, the one or more sensors 160 may detect that an obstacle has entered the path of the vehicle 100, such as, for example, a pedestrian stepping in front of the path of the vehicle 100. In that case, the one or more processors 106 may execute logic to apply the brakes 194 of the vehicle 100, or in some cases the one or more processors 106 may execute logic to display a warning on one or more displays 191 of the vehicle 100. In some cases, the characteristic sensed by the environment may cause the one or more processors 106 to execute machine readable instructions to cause an audible warning be emitted by one or more speakers 193 of the vehicle 100. In yet another non-limiting example, the vehicle 100 is an autonomous vehicle and at least one of the one or more sensors 160 is LiDAR. In that case, the one or more processors 106 execute machine readable instructions to navigate the vehicle 100 autonomously 195.

As described herein, in some embodiments, vehicle-to-vehicle communication may be used in addition to or in place of the other sensors described herein. In such embodiments, the vehicle 100 includes network interface hardware 167 for communicatively coupling one or more processors 106 to other vehicles 200 such that data may be received from and sent to other vehicles 200 configured with vehicle-to-vehicle communication. For instance, the vehicle 100 and the other vehicle 200 may communicate with one another to send and receive information relevant to speed, road conditions, oncoming obstacles, etc. The network interface hardware 167 can be communicatively coupled to the communication path 107 and can be any device capable of transmitting and/or receiving data via a network. Accordingly, the network interface hardware 167 can include a communication transceiver for sending and/or receiving any wired or wireless communication. For example, the network interface hardware 167 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 167 includes hardware configured to operate in accordance with the Bluetooth wireless communication protocol. In another embodiment, network interface hardware 167 may include a Bluetooth send/receive module for sending and receiving Bluetooth communications to/from a mobile device. Some embodiments may not be configured for vehicle-to-vehicle communication and may therefore not include the network interface hardware 167.

It should now be apparent the vehicles and vehicle roof structures according to embodiments disclosed herein allow for one or more sensors to be concealed within the roof structure of the vehicle. By concealing the one or more sensors within the roof structure, the sensors may remain largely hidden from view. Thus, sensors may be placed along higher points of the vehicle which may improve sensor function will preserving the visual appeal of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle roof structure for concealing one or more sensors comprising:
    a roof panel comprising a window receiving portion;
    a front header supporting the roof panel;
    a window extending toward the roof panel and supported on the window receiving portion of the roof panel;
    a headliner extending along an interior portion of the roof panel to the window and at least partially spaced from the roof panel in a direction of an interior of the vehicle to provide a sensor mounting volume therebetween, wherein the window extends along at least a portion of the sensor mounting volume; and
    one or more sensors coupled to the window receiving portion of the roof panel at a position forward of the front header in a vehicle longitudinal direction and positioned behind the window within the sensor mounting volume to provide a signal indicative of a characteristic of an environment of the vehicle detected by the one or more sensors through the window.

2. The vehicle roof structure of claim 1, wherein the window comprises a lower portion and a transition portion, the transition portion of the window comprises a shade band.

3. The vehicle roof structure of claim 2, wherein the shade band of the transition portion of the window is provided by at least one of window tinting and black ceramic paint.

4. The vehicle roof structure of claim 2, wherein the transition portion of the window further comprises one or more sensor regions and a concealing region, wherein the one or more sensor regions has greater visible light transmission than the concealing region.

5. The vehicle roof structure of claim 2, wherein the transition portion of the window is integral with the lower portion of the window.

6. The vehicle roof structure of claim 2, wherein the transition portion of the window is a separate panel from the lower portion of the window.

7. The vehicle roof structure of claim 6, wherein a thickness of the transition portion of the window is less than a thickness of the lower portion of the window.

8. The vehicle roof structure of claim 1 further comprising one or more sensor brackets, wherein the one or more sensor brackets are coupled to the window receiving portion of the roof panel.

9. A vehicle roof structure for concealing one or more sensors comprising:
    a roof panel comprising one or more sensor cavities formed therein;
    a window extending by the one or more sensor cavities and supported on the roof panel at a position forward of the one or more sensor cavities in a vehicle longitudinal direction; and
    one or more sensors positioned within the one or more sensor cavities of the roof panel to provide a signal indicative of a characteristic of an environment of the vehicle detected by the one or more sensors through the window.

10. The vehicle roof structure of claim 9, wherein the window comprises a lower portion and a transition portion, the transition portion of the window having reduced visible light transmission.

11. The vehicle roof structure of claim 10, wherein the transition portion of the window is substantially curved relative to the lower portion of the window to substantially blend with the roof panel.

12. The vehicle roof structure of claim 10, wherein a thickness of the transition portion of the window is less than a thickness of the lower portion of the window.

13. The vehicle roof structure of claim 9, wherein the one or more sensors are at least one of LiDAR, vehicle-to-vehicle communication, camera, radar, and laser.

14. The vehicle roof structure of claim 9, wherein the one or more sensors are a plurality of sensors positioned along a width of the window.

15. The vehicle roof structure of claim 9, wherein:
 the one or more sensors are communicatively coupled to one or more processors;
 the one or more processors receive from the one or more sensors the signal indicative of the characteristic of the environment; and
 the one or more processors execute logic to cause the vehicle to respond to the signal indicative of the characteristic of the environment from the one or more sensors.

16. A vehicle for concealing one or more sensors comprising:
 a roof structure comprising:
  a roof panel comprising a window receiving portion;
  a front header supporting the roof panel;
  a window extending toward the roof panel and supported on the window receiving portion of the roof panel;
  a headliner extending along an interior portion of the roof panel to the window and at least partially spaced from the roof panel in a direction of an interior of the vehicle to provide a sensor mounting volume therebetween, wherein the window extends along at least a portion of the sensor mounting volume; and
  one or more sensors coupled to the window receiving portion of the roof panel at a position forward of the front header in a vehicle longitudinal direction and positioned behind the window and within the sensor mounting volume to provide a signal indicative of a characteristic of an environment of the vehicle detected by the one or more sensors through the window; and
 one or more processors communicatively coupled to the one or more sensors to receive from the one or more sensors the signal indicative of the characteristic of the environment and execute logic to cause the vehicle to respond to the signal indicative of the characteristic of the environment received from the one or more sensors.

17. The vehicle of claim 16, wherein the roof structure further comprises one or more sensor brackets coupled the one or more sensors to couple the one or more sensors to the roof panel.

18. The vehicle of claim 16, wherein the one or more sensors are at least one of LiDAR, vehicle-to-vehicle communication, camera, radar, and laser.

19. The vehicle of claim 16, wherein the window comprises a lower portion and a transition portion, the transition portion of the window having reduced visible light transmission.

20. The vehicle of claim 16, wherein the roof structure further comprises one or more sensor brackets, wherein the one or more sensor brackets are coupled to the window receiving portion of the roof panel, wherein the one or more sensor brackets are coupled to the one or more sensors to direct the one or more sensors toward the window of the vehicle.

* * * * *